United States Patent
Kim (10) Patent No.: US 8,767,052 B2
(45) Date of Patent: Jul. 1, 2014

(54) REMOTE CONTROLLER, DISPLAY APPARATUS, 3D GLASSES AND CONTROL METHOD THEREOF

(75) Inventor: Jae-hwan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 213 days.

(21) Appl. No.: 13/160,857

(22) Filed: Jun. 15, 2011

(65) Prior Publication Data

US 2012/0092464 A1  Apr. 19, 2012

(30) Foreign Application Priority Data

Oct. 15, 2010  (KR) ......................... 10-2010-0100760

(51) Int. Cl.
*H04N 13/04* (2006.01)
*H04N 9/47* (2006.01)

(52) U.S. Cl.
CPC ....... *H04N 13/0497* (2013.01); *H04N 13/0404* (2013.01)
USPC ............................................. 348/51; 348/55

(58) Field of Classification Search
CPC .......... H04N 13/0438; H04N 13/0497; H04N 2213/008; H04N 13/0452; H04N 5/4403; H04N 13/04; H04N 7/173
USPC ........... 348/51, E13.075, 14.01–14.05, 14.12, 348/43, E13.064; 345/733, 747
See application file for complete search history.

(56) References Cited

U.S. PATENT DOCUMENTS

| | | | |
|---|---|---|---|
| 6,791,599 | B1 | 9/2004 | Okada et al. |
| 2006/0004834 | A1* | 1/2006 | Pyhalammi et al. ........... 707/102 |
| 2008/0062069 | A1 | 3/2008 | Sinclair et al. |
| 2010/0007582 | A1 | 1/2010 | Zalewski |
| 2010/0085424 | A1 | 4/2010 | Kane et al. |
| 2011/0001805 | A1* | 1/2011 | Mentz et al. ..................... 348/55 |
| 2011/0012993 | A1* | 1/2011 | Kuno ............................... 348/43 |
| 2011/0310235 | A1* | 12/2011 | Sasaki et al. .................... 348/54 |
| 2012/0019633 | A1* | 1/2012 | Holley ............................ 348/53 |

OTHER PUBLICATIONS

Communication, dated Jul. 3, 2013, issued by the European Patent Office in counterpart European Application No. 11169186.1.

* cited by examiner

*Primary Examiner* — Dave Czekaj
*Assistant Examiner* — Dramos I Kalapodas
(74) *Attorney, Agent, or Firm* — Sughrue Mion, PLLC (57) ABSTRACT

A remote controller, a display apparatus, 3D glasses and a control method thereof are provided. The remote controller includes a first communication unit which communicates with a three-dimensional (3D) display apparatus, a user input unit which allows a user to input a selection for controlling the 3D display apparatus, a signal processor which selects one of a two-dimensional (2D) mode and a 3D mode and processes a video signal to be displayed in the selected mode, a display unit which displays the processed video signal in the selected mode, and a controller which controls the first communication unit to send the 3D display apparatus a control signal corresponding to a user's selection input through the user input unit, and the signal processor to select one of the 2D mode and the 3D mode based on the display mode of the 3D display apparatus.

30 Claims, 6 Drawing Sheets

REMOTE CONTROLLER, DISPLAY APPARATUS, 3D GLASSES AND CONTROL METHOD THEREOF

CROSS-REFERENCE TO RELATED APPLICATION

This application claims priority from Korean Patent Application No. 10-2010-0100760, filed on Oct. 15, 2010 in the Korean Intellectual Property Office, the disclosure of which is incorporated herein by reference.

BACKGROUND

1. Field

Apparatuses and methods consistent with the exemplary embodiments relate to a remote controller, a three-dimensional (3D) display apparatus, 3D glasses and a control method thereof, and more particularly, to a remote controller, a 3D display apparatus, 3D glasses and a control method thereof, in which a display unit of a remote controller displays an image in one of a two-dimensional (2D) mode and a 3D mode in accordance with a display mode of the 3D display apparatus or operation of the 3D glasses.

2. Description of the Related Art

A related art remote controller capable of remotely controlling a display apparatus such as a television (TV) may include a display screen. The display screen of the related art remote controller receives a 2D video signal and displays an image in a 2D mode. However, the related art remote controller cannot display an image based on a 3D video signal in the 2D mode if receiving the 3D video signal from an external source. Also, the related art remote controller cannot display an image in a 3D mode.

SUMMARY

According to an exemplary embodiment, there is provided a remote controller, a 3D display apparatus, 3D glasses and a control method thereof, in which a display unit of a remote controller displays an image in one of a two-dimensional (2D) mode and a 3D mode in accordance with a display mode of the 3D display apparatus or operation of the 3D glasses.

Another exemplary embodiment provides a remote controller including a first communication unit which communicates with a three-dimensional (3D) display apparatus, a user input unit which allows a user to input user's selection for controlling the 3D display apparatus, a signal processor which selects one of a two-dimensional (2D) mode and a 3D mode and processes a video signal to be displayed in the selected mode, a display unit which displays the processed video signal in the selected mode, and a controller which controls the first communication unit to send the 3D display apparatus a control signal corresponding to a user's selection input through the user input unit, and the signal processor to select one of the 2D mode and the 3D mode on the basis of the display mode of the 3D display apparatus.

The signal processor may select one of the 2D mode and the 3D mode on the basis of display mode information received from the 3D display apparatus.

The remote controller may further include a second communication unit which communicates with 3D glasses interlocking with the 3D display apparatus, wherein the signal processor selects one of the 2D mode and the 3D mode on the basis of display mode information received from the 3D glasses.

The video signal may be received from the 3D display apparatus.

In the case of the 3D mode, the display unit may alternately display a left-eye image and a right-eye image in sync with a synchronous signal received from the 3D display apparatus.

In the case of the 3D mode, the display unit may alternately display a left-eye image and a right-eye image in synch with a synchronous signal received from 3D glasses interlocking with the 3D display apparatus.

According to another exemplary embodiment, a display apparatus is provided that includes a communication unit which communicates with a remote controller, a signal processor which selects one of a two-dimensional (2D) mode and a three-dimensional (3D) mode and processes a video signal to be displayed in the selected mode, a display unit which displays the processed video signal in the selected mode, and a controller which controls the communication unit to send the remote controller display mode information corresponding to a display mode of the display unit.

The display apparatus may further include a synchronous signal generator which generates a synchronous signal corresponding to a 3D image if the display unit displays the 3D image in the 3D mode.

The controller may control the communication unit to transmit the generated synchronous signal to the remote controller.

The display apparatus may further include a shutter communication unit which communicates with 3D glasses, wherein the controller controls the shutter communication unit to transmit the generated synchronous signal to the 3D glasses.

According to yet another exemplary embodiment three-dimensional (3D) glasses are provided in a 3D display apparatus, the 3D glasses including a first communication unit which communicates with the 3D display apparatus, a shutter unit which includes a left shutter and a right shutter alternately opened and shut, a second communication unit which communicates with a remote controller controlling the 3D display apparatus, and a controller which controls the shutter unit to be selectively opened and shut in sync with a synchronous signal corresponding to a 3D image, received from the 3D display apparatus through the first communication unit, and controls the second communication to transmit display mode information of the 3D display apparatus to the remote controller.

According to still another exemplary embodiment, a remote controller is provided that includes a first communication unit which communicates with a three-dimensional (3D) display apparatus, a user input unit which allows a user to input a selection for controlling the 3D display apparatus, a signal processor which processes a video signal, a display unit which displays the processed video signal, and a controller which controls the first communication unit to send the 3D display apparatus a control signal corresponding to a user's selection input through the user input unit, and the signal processor to display a 3D video signal in a two-dimensional (2D) mode if the predetermined video signal is a 3D video signal.

The controller may control the signal processor to display an image in the 2D mode on the basis of a left-eye image of the 3D video signal.

The controller may control the signal processor to display an image in the 2D mode on the basis of a right-eye image of the 3D video signal.

The video signal may be received from the 3D display apparatus.

According to still another exemplary embodiment, a display apparatus is provided, including a communication unit which communicates with a remote controller controlling the display apparatus, a signal processor which processes a video signal, a display unit which displays the processed video signal, and a controller which sends the remote controller a two-dimensional (2D) video signal based on one of a left-eye image and a right-eye image of a three-dimensional (3D) video signal if the video signal is the 3D video signal.

The controller may control the 2D video signal based on the left-eye image to be continuously transmitted to the remote controller.

The controller may control the 2D video signal based on the right-eye image to be continuously transmitted to the remote controller.

According to another exemplary embodiment, a method of controlling a remote controller is provided for controlling a three-dimensional (3D) display apparatus, the method including controlling a signal processor to select one of a 2D mode and a 3D mode on the basis of a display mode of the 3D display apparatus and process a video signal in the selected mode, and displaying the processed video signal on a display unit in the selected mode.

The method may further include receiving display mode information from the 3D display apparatus, wherein the controlling includes selecting one of the 2D mode and the 3D mode on the basis of the received display mode information.

The method may further include receiving display mode information from 3D glasses interlocking with the 3D display apparatus, wherein the controlling includes selecting one of the 2D mode and the 3D mode on the basis of the received display mode information.

The video signal may be received from the 3D display apparatus.

The method may further include receiving a synchronous signal from the 3D display apparatus, wherein the displaying includes displaying a left-eye image and a right-eye image alternately in sync with the received synchronous signal if the display unit is in the 3D mode.

The method may further include receiving a synchronous signal from 3D glasses interlocking with the 3D display apparatus, wherein the displaying includes displaying a left-eye image and a right-eye image alternately in sync with the received synchronous signal if the display unit is in the 3D mode.

According to another exemplary embodiment, a method of controlling a three-dimensional (3D) display apparatus is provided, the method including controlling a signal processor to select one of a two-dimensional (2D) mode and a 3D mode and process a video signal in the selected mode, displaying the processed video signal on a display unit in the selected mode, and sending a remote controller display mode information corresponding to a display mode of the display unit.

The method may further include generating a synchronous signal corresponding to a 3D image if the display unit displays the 3D image in the 3D mode.

The method may further include transmitting the generated synchronous signal to the remote controller.

According to yet another exemplary embodiment, a method of controlling three-dimensional (3D) glasses in a 3D display apparatus is provided, the method including, controlling a shutter unit to open and shut a left shutter and a right shutter alternately in sync with a synchronous signal corresponding to a 3D image received from the 3D display apparatus, and transmitting display mode information of the 3D display apparatus to a remote controller controlling the 3D display apparatus.

BRIEF DESCRIPTION OF THE DRAWINGS

The above and/or other aspects will become apparent from the following description of the exemplary embodiments, taken in conjunction with the accompanying drawings, in which.

DETAILED DESCRIPTION OF THE EXEMPLARY EMBODIMENTS

Exemplary embodiments will be described in detail with reference to accompanying drawings so as to be realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
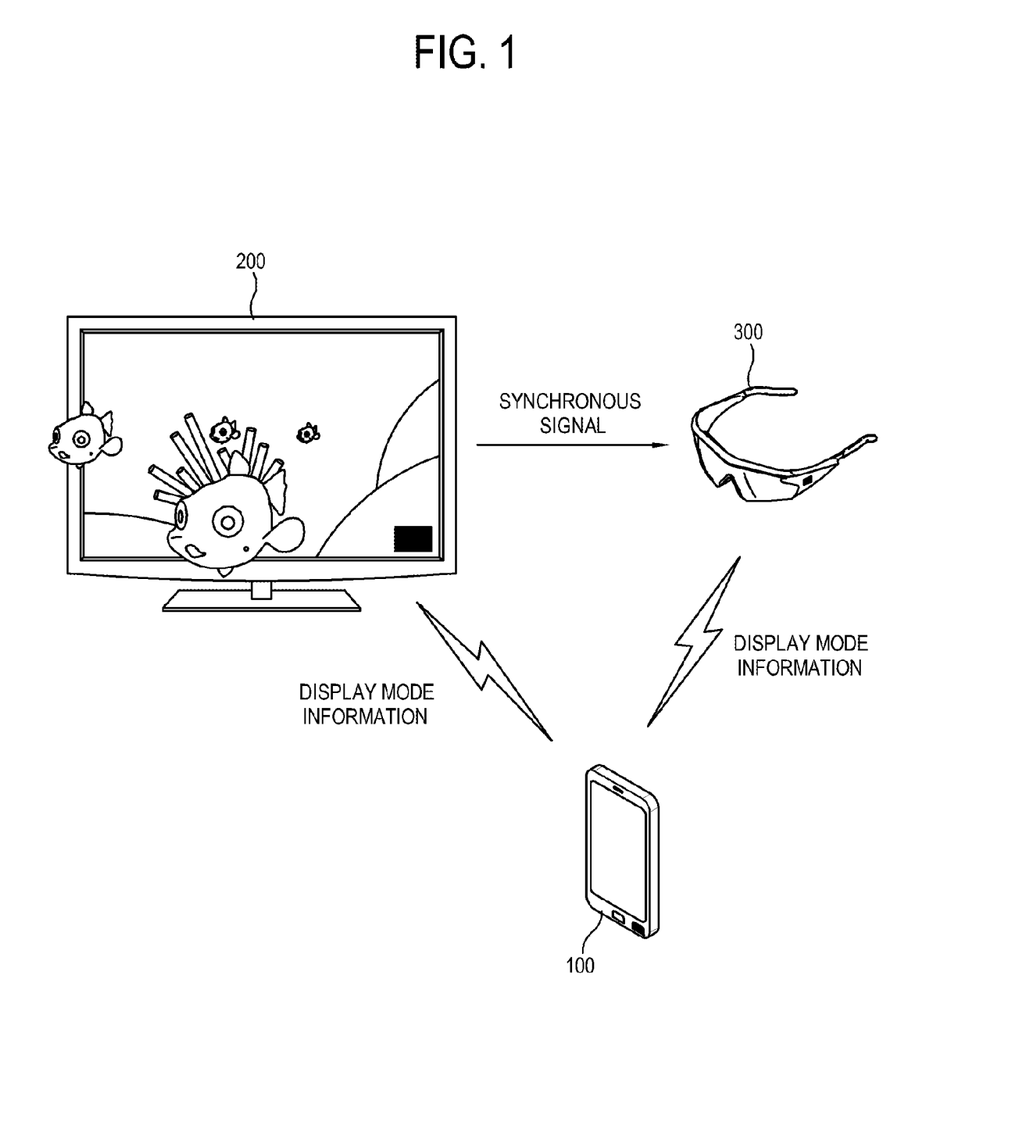
FIG. 1 is a schematic view of a system including a remote controller, a display apparatus and 3D glasses according to an exemplary embodiment.

FIG. 1 is a schematic view of a system including a remote controller, a display apparatus and 3D glasses according to an exemplary embodiment. The system includes a remote controller 100, a display apparatus 200, and 3D glasses 300. The remote controller 100 in this exemplary embodiment may include a display unit. The remote controller 100, the display apparatus 200 and the 3D glasses 300 are all connected via communication units (e.g., predetermined), and various control signals and data are transmitted and received through the communication units.

The remote controller 100 displays an image in one of a 2D mode and a 3D mode on the basis of a display mode of the display apparatus 200. The remote controller 100 may receive display mode information from the display apparatus 200. Thus, if the display apparatus 200 displays an image (e.g., predetermined) in the 2D mode, a video signal (e.g., predetermined) is displayed as an image (e.g., predetermined) in the 2D mode on the display unit of the remote controller 100. Also, if the display apparatus 300 displays an image (e.g., predetermined) in the 3D mode, an image (e.g., predetermined) is displayed in the 3D mode on the display unit of the remote controller 100.

Further, a user can control the 2D/3D display mode of the display apparatus 200 through the remote controller 100. In this case, the remote controller 100 sends the display apparatus 200 a control signal for changing the display mode according to a user's selection, and the display unit of the remote controller 100 also displays an image (e.g., predetermined) in one of the 2D and 3D modes in accordance with the user's selection.

The display apparatus 200 includes a display device capable of displaying a 3D image with or without glasses. When the display apparatus 200 displays a 3D image by a method of using glasses, there is a need of 3D glasses 300. The 3D glasses 300 start operating as the display apparatus 200 displays a 3D image. At this time, the 3D glasses 300 may transmit the display mode information of the display apparatus 200 to the remote controller 100. The display mode information may be received from the display apparatus 200 by the 3D glasses 300 and transmitted to the remote controller 100, or may be generated by the 3D glasses in accordance with the operations and transmitted to the remote controller 100. Accordingly, if the remote controller 100 receives the display mode information from the 3D glasses 300, the display unit of the remote controller displays a video signal (e.g., predetermined) in one of the 2D and 3D modes.

Figure 2:
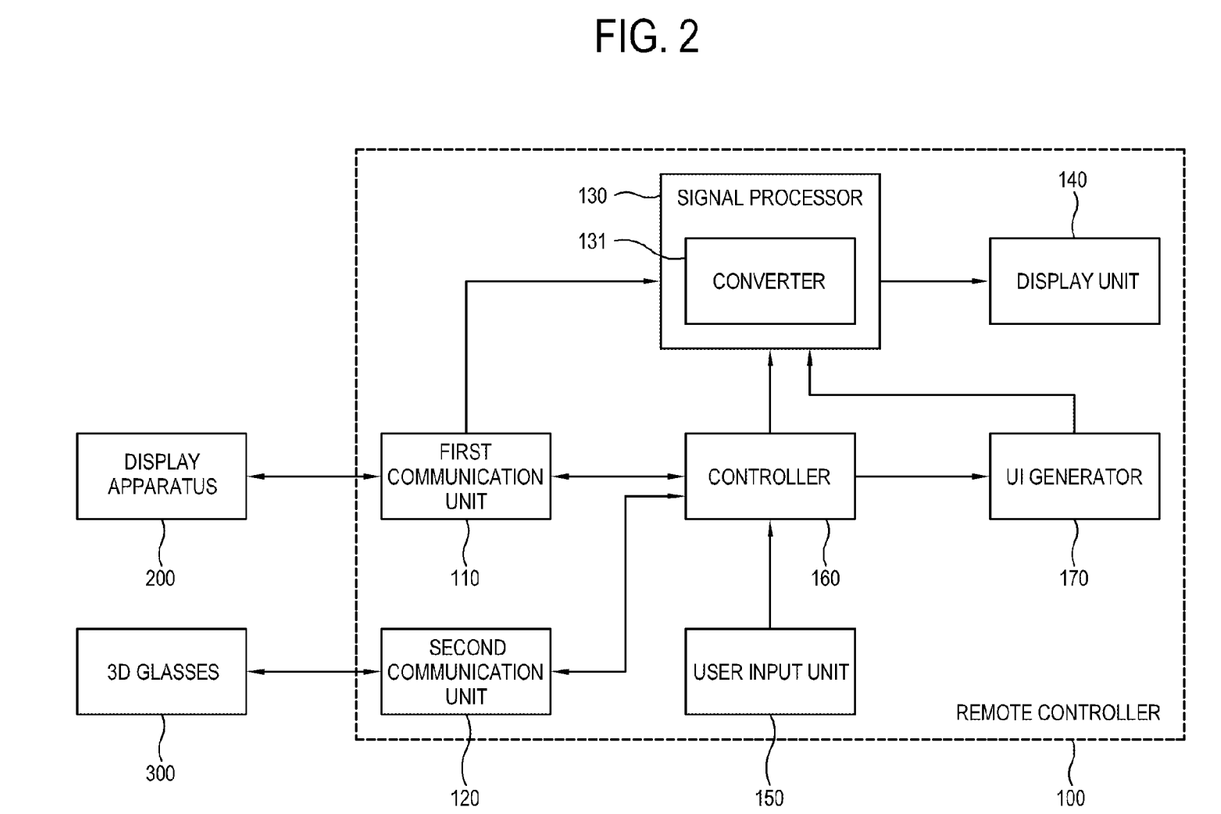
FIG. 2 is a control block diagram according to an exemplary embodiment of the remote controller of FIG. 1.
Figure 3:
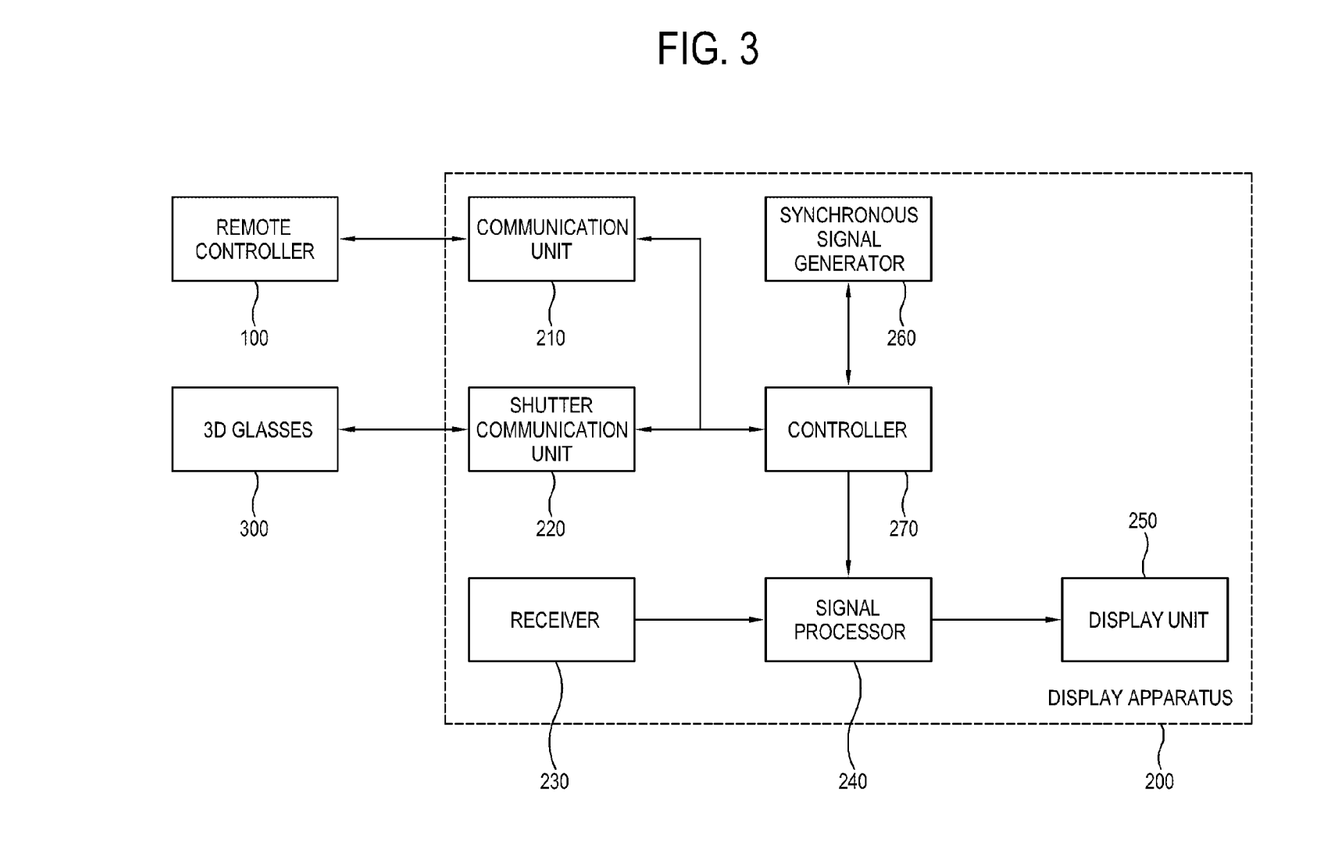
FIG. 3 is a control block diagram according to an exemplary embodiment of the display apparatus of FIG. 1.
Figure 4:
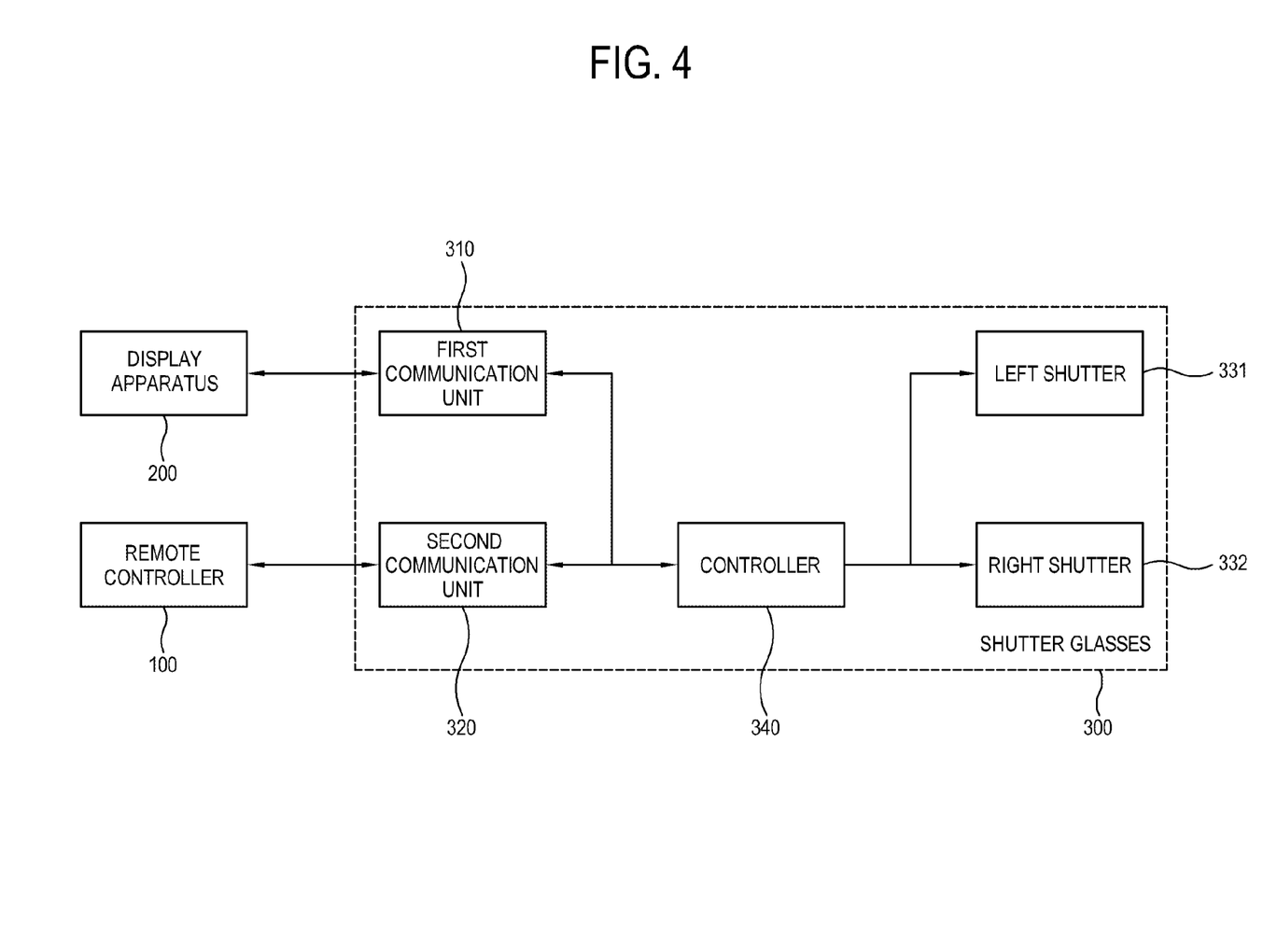
FIG. 4 is a control block diagram of the 3D glasses according to an exemplary embodiment of FIG. 1.

Below, more details will be described with reference to FIG. 2 showing a control block diagram of the remote controller 100 according to an exemplary embodiment, FIG. 3 showing a control block diagram of the display apparatus 200 according to an exemplary embodiment, and FIG. 4 showing a control block diagram of the 3D glasses 300 according to an exemplary embodiment.

As shown in FIG. 2, the remote controller 100 includes a first communication unit 110, a second communication unit 120, a signal processor 130, a display unit 140, a user input unit 150, a controller 160, and a user interface (UI) generator 170.

The remote controller 100 is an electronic device capable of remotely controlling the display apparatus 200. The remote controller 100 in this exemplary embodiment may be achieved by any electronic device understood by those skilled in the art that may include a display unit and is capable of remotely controlling the display apparatus.

The first communication unit 110 may communicate with the communication unit 210 of the display apparatus 200, and perform wireless communication such as wireless local area network (WLAN), radio frequency (RF), zigbee, Bluetooth, digital living network alliance (DLNA), etc., but is not limited thereto. The remote controller 100 may transmit a control signal based on a user's selection to the display apparatus 200 through the first communication unit 110. Also, the remote controller 100 may receive the display mode information from the display apparatus 200 through the first communication unit 110. Further, the remote controller 100 may receive a synchronous signal corresponding to a 3D image from the display apparatus 200 through the first communication unit 110 if the display apparatus 200 displays a 3D image.

The second communication unit 120 may communicate with a second communication unit 320 of the 3D glasses 300, and perform the wireless communication such as WLAN, RF, zigbee, Bluetooth, DLNA, etc., but is not limited thereto. The remote controller 100 may receive the display mode information from the 3D glasses through the second communication unit 120. Also, if the display mode information received from the 3D glasses 300 indicates the 3D mode, a synchronous signal for alternately displaying a left eye image and a right eye image may be received through the second communication unit 120.

The signal processor 130 can select one of the 2D and 3D modes, and process a video signal (e.g., predetermined) to be displayed in the selected mode.

The signal processor 130 performs various video processes previously set up with respect to a video signal. The kind of video processes is not limited, and for example the video processes may include decoding and encoding corresponding to various video formats, de-interlacing, frame refresh rate conversion, scaling, noise reduction, detail enhancement, line scanning, etc. The signal processor 240 may perform the video processes individually or together.

The signal processor 130 includes a converter 131 for converting a 2D video signal into a 3D video signal, or the 3D video signal into the 2D video signal. Thus, the converter 131 converts a 2D video signal into a 3D video signal, or the 3D video signal into the 2D video signal in accordance with the display mode of the display apparatus 200.

A video signal (e.g., predetermined) to be processed by the signal processor 130 includes a graphic user interface (GUI) video signal generated in the UI generator 170 of the remote controller 100; an image received from the display apparatus 200 and equivalent to the image displayed on the display apparatus 100; and a video signal (e.g., predetermined) received from the third-party external electronic device.

The UI generator 170 can generate a graphic user interface (GUI) for allowing a user to input a selection to control the display apparatus 200 under control of the controller 160. The generated GUI is processed by the signal processor 130 and displayed on the display unit 140 in one of the 2D and 3D modes in accordance with the display mode of the display apparatus 200.

The remote controller 100 can receive a video signal displayed on the display apparatus 200 from the display apparatus 200 via the first communication unit 110. Thus, the same image as the image displayed on the display apparatus 200 can be displayed on the remote controller 100. When receiving the video signal displayed on the display apparatus 200 from the display apparatus 200 through the first communication unit 110, if the video signal contains information about whether it is related to a 2D or 3D image, the information is extracted from the video signal and then an image based on the video signal is displayed in one of the 2D and 3D modes on the display unit 140 of the remote controller 100 in accordance with the extracted information.

The remote controller 100 may further include a third communication unit (not shown) capable of communicating with an external third electronic device. Thus, the remote controller 100 can receive a 2D or 3D video signal from the external third electronic device through the third communication unit (not shown). In such a case, a video signal received from the third electronic device can be processed to be displayed on the display unit 140 in one of the 2D and 3D modes in accordance with the display mode of the display apparatus 200 or the display mode received from the 3D glasses 300.

When the remote controller 100 in this exemplary embodiment displays a 3D image, the 3D image can be realized with polarizing- or shutter-type glasses or without glasses. In the case of the polarizing-glasses method, the signal processor 130 horizontally scans video signals (e.g., predetermined) corresponding to left- and right-eye images alternately in a plurality of horizontal scan lines to the display unit 140.

In the case of the shutter-glasses method, the signal processor 130 alternately scans the video signals corresponding to the left- and right-eye images among the video signals (e.g., predetermined) to the display unit 140. Thus, the left- and right-eye images are alternately displayed on the display unit 140 for a non-scanning period of time. At this time, a synchronous signal for alternately displaying the left- and right-eye images may be received from the display apparatus 200 or the 3D glasses 300.

The display unit 140 displays an image based on the video signal processed by the signal processor 130 in the display mode selected in the signal processor 130. The display unit 140 includes a display panel (not shown) for displaying the image, and the display panel (not shown) may include a liquid crystal display (LCD) panel including a liquid crystal layer, an organic light emitting diode (OLED) panel including an organic light emitting layer, a plasma display panel (PDP), etc. If the remote controller 100 employs the polarizing-glasses method for displaying a 3D image, the display unit 140 includes a polarizing filter. If the remote controller 100 employs no glasses in displaying a 3D image, the display unit 140 may further include an optical plate such as a parallax barrier or a reticular lens.

The user input unit 150 allows a user to input a selection for controlling the display apparatus 200, which may be achieved by a plurality of physical function keys provided in the remote controller 100 or a touch panel provided in the display unit 140.

Thus, a user can input a variety of a selection such as channel switching, volume control, menu setup, etc. for the display apparatus 200 through the user input unit 150. Such an input signal is transmitted as a control signal to the display apparatus 200 under control of the controller 160.

The user input unit 150 may include a proximity sensor (not shown) or the like. Accordingly, if the GUI generated by the UI generator 170 is processed by the signal processor 130 and displayed as a 3D image on the display unit 140, a user's selection in a stereoscopic GUI can be sensed by the proximity sensor.

The controller 160 according to an exemplary embodiment controls the first communication unit 110 to transmit a control signal corresponding to a user's selection input through the user input unit 150 to the display apparatus 200, and controls the signal processor 130 to select one of the 2D and 3D modes on the basis of the display mode of the display apparatus 200. If the display mode of the display apparatus 200 is the 2D mode, the controller 160 controls the signal processor 120 to process a video signal (e.g., predetermined) in the 2D mode and provide a display the display unit 140. Also, the display mode of the display apparatus 200 is the 3D mode, the controller 160 controls the signal processor 120 to process a video signal (e.g., predetermined) in the 3D mode and provide a display the display unit 140. If the display apparatus 200 and the remote controller 100 display a 3D image by the shutter-glasses method, the controller 160 may control the first communication unit 110 to receive a synchronous signal generated corresponding to the 3D image from the display apparatus 200, and control left- and right-eye images to be alternately displayed in sync with the synchronous signal. Also, the controller 160 may control the signal processor 130 to process a video signal (e.g., predetermined) in one of the 2D and 3D modes on the basis of the display mode information of the display apparatus 200 received from the 3D glasses 300 through the second communication unit 120. Further, the controller 160 may control the signal processor 130 to process a video signal (e.g., predetermined) in one of the 2D mode and the 3D mode in accordance with information about operation of the 3D glasses 300 received through the second communication unit 120.

According to another exemplary embodiment, the controller 160 may control the first communication unit 110 to transmit a control signal corresponding to a user's selection input through the user input unit 150 to the display apparatus 200, and control the signal processor 130 to display a 3D video signal (e.g., predetermined) in the 2D mode. Although the display apparatus 200 displays an image in the 3D mode, the remote controller 100 forcibly converts the 3D video signal into a 2D video signal and displays it. At this time, the controller 160 may control the signal processor 130 to display an image in the 2D mode on the basis of one of the left-eye image and the right-eye image corresponding to the 3D video signal. Here, the 3D video signal (e.g., predetermined) may be received from the display apparatus 200 through the first communication unit 110.

FIG. 3 is a control block diagram of the display apparatus of FIG. 1. The display apparatus 200 includes a communication unit 210, a shutter communication unit 220, a receiver 230, a signal processor 240, a display unit 250, a synchronous signal generator 260, and a controller 270 performing control of the display apparatus 200.

The communication unit 210 of the display apparatus 200 communicates with the first communication unit 110 of the remote controller 100, which may perform communication based on WLAN, RF, zigbee, Bluetooth, DLNA, etc. Through the communication unit 210 of the display apparatus, information about an image displayed on the display apparatus 200 can be transmitted to the remote controller 100, and a video signal of the image currently displayed on the display apparatus 200 may be transmitted to the remote controller 100.

The shutter communication unit 220 communicates with the first communication unit 310 of the 3D glasses 300, which may perform communication based on WLAN, RF, zigbee, Bluetooth, DLNA, etc. The shutter communication unit 220 is provided when the 3D glasses 300 are used, as the display apparatus 200 employs a 3D-glasses method in displaying a 3D image. Through the shutter communication unit 220, the display apparatus 200 can transmit a synchronous signal generated by the synchronous signal generator 260 to the 3D glasses 300.

The receiver 230 receives a video signal from an external video source (not shown) and transmits the video signal to the signal processor 240. The receiver 230 may be achieved by various types in accordance with formats of the received video signal and types of the display apparatus 200. The video signal includes a 2D or 3D video signal. For example, in the case that the display apparatus 200 is a TV, the receiver 230 wirelessly receives a radio frequency (RF) signal from a broadcasting receiving device, or receive a video signal based on standards such as composite video, component video, super video, Syndicat des Constructeurs des Appareils Radiorécepteurs et Téléviseurs (SCART), high definition multimedia interface (HDMI), etc. At this time, the receiver 230 may further include an antenna (not shown) and/or a tuner (not shown) tuned to a broadcasting channel. For example, in the case that the display apparatus 200 is a monitor for a personal computer (PC), the receiver 230 may support standards such as D-SUB capable of transmitting RGB signals based on VGA, digital video interactive (DVI), DVI-analog (A), DVI-integrated digital/analog (I), DVI-digital (D), HDMI, etc. Also, the receiver 230 may be achieved by a DisplayPort, a unified display interface (UDI), a wireless HD, etc.

The signal processor 240 selects either of the 2D mode or the 3D mode and processes a predetermined video signal to be displayed in the selected mode. Thus, the signal processor 240 processes a 2D or 3D video signal (e.g., predetermined) received through the receiver 230 so that the display unit 250 can display a 2D or 3D image corresponding to the processed video signal.

The signal processor 240 performs various video processes previously set up with regard to a video signal (e.g., predetermined). The kind of video processes are not limited thereto, and for example the video processes may include decoding and encoding corresponding to various video formats, de-interlacing, frame refresh rate conversion, scaling, noise reduction, detail enhancement, line scanning, etc. The signal processor 240 may perform the video processes individually or together.

The signal processor 240 includes a converter (not shown) for converting a 2D video signal into a 3D video signal, or the 3D video signal into the 2D video signal. Thus, even if the receiver 230 receives a 2D video signal, the converter (not shown) converts the 2D video signal into a 3D video signal to display a 3D image on the display unit 250, and vice versa.

When the display apparatus 200 in this exemplary embodiment displays a 3D image, the 3D image can be realized with polarizing- or shutter-type glasses or without glasses. In the case of the polarizing-glasses method, the signal processor 240 horizontally scans video signals (e.g., predetermined) corresponding to left- and right-eye images alternately in a plurality of horizontal scan lines to the display unit 250.

In the case of the shutter-glasses method, the signal processor 240 alternately scans the video signals corresponding to the left- and right-eye images among the video signals (e.g., predetermined) to the display unit 250. Thus, the left- and right-eye images are alternately displayed on the display unit 140 for a non-scanning period of time.

The display unit 250 displays a 2D or 3D image based on the image processed by the signal processor 240. The display unit 250 includes a display panel (not shown) for displaying the image, and the display panel (not shown) may include a liquid crystal display (LCD) panel including a liquid crystal layer, an organic light emitting diode (OLED) panel including an organic light emitting layer, a plasma display panel (PDP), etc. If the display apparatus 200 employs the polarizing-glasses method for displaying a 3D image, the display unit 250 includes a polarizing filter. If the display apparatus 200 employs no glasses in displaying a 3D image, the display unit 250 may further include an optical plate such as a parallax barrier or a reticular lens.

The synchronous signal generator 260 generates a synchronous signal corresponding to a 3D image displayed on the display unit 250. If the display apparatus 200 displays a 3D image by the shutter-glasses method, the synchronous signal generator 260 is provided. Under control of the controller 270, the generated synchronous signal is transmitted to the remote controller 100 via the communication unit 210, and transmitted to the 3D glasses 300 via the shutter communication unit 220.

The controller 270 according to an exemplary embodiment controls the communication unit 210 to send the remote controller 100 the display mode information corresponding to the display mode of an image displayed on the display unit 250. That is, the display mode information notifying whether the image displayed on the display unit 250 is a 2D mode or a 3D mode is transmitted to the remote controller 100. Thus, according to whether the image displayed on the display unit 250 is the 2D mode or the 3D mode, the remote controller 100 displays an image (e.g., predetermined) in the 2D mode or the 3D mode.

According to another exemplary embodiment, if a video signal (e.g., predetermined) is a 3D video signal, the controller 270 may transmit a 2D video signal to the remote controller 100 on the basis of one of left- and right-eye images corresponding to the 3D video signal. Therefore, even though the display apparatus 200 displays a video signal (e.g., predetermined) in the 3D mode, the 3D video signal is converted into a 2D video signal and then transmitted to the remote controller 100 so that it can be displayed in the 2D mode. The controller 270 may control the 2D video signal based on the left-eye image to be continuously transmitted to the remote controller 100, or the 2D video signal based on the right-eye image to be continuously transmitted to the remote controller 100.

FIG. 4 is a control block diagram of the 3D glasses of FIG. 1. The 3D glasses 300 include a first communication unit 310, a second communication unit 320, a shutter unit including left shutter 331 and right shutter 332, and a controller 340.

The 3D glasses are provided when the display apparatus 200 employs the shutter-glasses method for displaying a 3D image.

The 3D glasses selectively open and shut a view for a left eye or a right eye of a user according to which one of left- and right-eye images is currently displayed in the case where the display apparatus 200 displays a 3D image. That is, if the display apparatus 200 displays a left-eye image, the 3D glasses 300 open the view for the left eye but shut the view for the right eye. On the other hand, if the display apparatus 200 displays a right-eye image, the 3D glasses 300 open the view for the right eye but shut the view for the left eye. The 3D glasses 300 use the synchronous signal received from the display apparatus 200 in order to open and shut the view for the left or right eye.

The first communication unit 310 of the 3D glasses 300 may communicate with the shutter communication unit 220 of the display apparatus 200, and perform wireless communication such as WLAN, RF, zigbee, Bluetooth, DLNA, etc. Through the first communication unit 310, the synchronous signal for opening and shutting the shutter unit is received from the display apparatus 200.

The second communication unit 320 of the 3D glasses 300 may communicate with the second communication unit 120 of the remote controller 100, and perform the wireless communication such as WLAN, RF, zigbee, Bluetooth, DLNA, etc. Through the second communication unit 320, the display mode information of the display apparatus 200 can be transmitted to the remote controller 100. The display mode information may be received from the display apparatus 200 through the first communication unit 310. Also, the display mode information may be generated by the controller 340 on the basis of the operation of the 3D glasses 300. That is, the controller 340 may generate the display mode information of informing that the display mode is the 3D mode when the 3D glasses 300 start operating, and generate the display mode information of informing that the display mode is the 2D mode when the 3D glasses 300 stop operating.

The shutter unit includes the left shutter 331 and the right shutter 332. If the synchronous signal is received from the display apparatus 200 through the first communication unit 310, the left shutter 331 and the right shutter 332 are alternately opened and shut in sync with the synchronous signal under control of the controller 340.

The controller 340 controls the shutter unit including left shutter 331 and right shutter 332 to be selectively opened and shut in sync with the synchronous signal corresponding to the 3D image, received from the display apparatus 200 via the first communication unit 310, and controls the second communication unit 320 to transmit the display mode information of the display apparatus 200 to the remote controller 100. The display mode information may be received from the display apparatus 200 or generated by the controller 340. That is, the controller 340 generates the display mode information for notifying that the display mode is the 3D mode when the 3D glasses 300 are powered on, and transmits the display mode information to the remote controller 100 via the second communication unit 320. At this time, the remote controller 100 displays a video signal (e.g., predetermined) in the 3D mode on the basis of the display mode information.

Also, the controller 340 generates the display mode information for notifying that the display mode is the 2D mode when the 3D glasses 300 are powered off, and transmits the display mode information to the remote controller 100 via the second communication unit 320. At this time, the remote controller 100 displays a video signal (e.g., predetermined) in the 2D mode on the basis of the display mode information.

Figure 5:
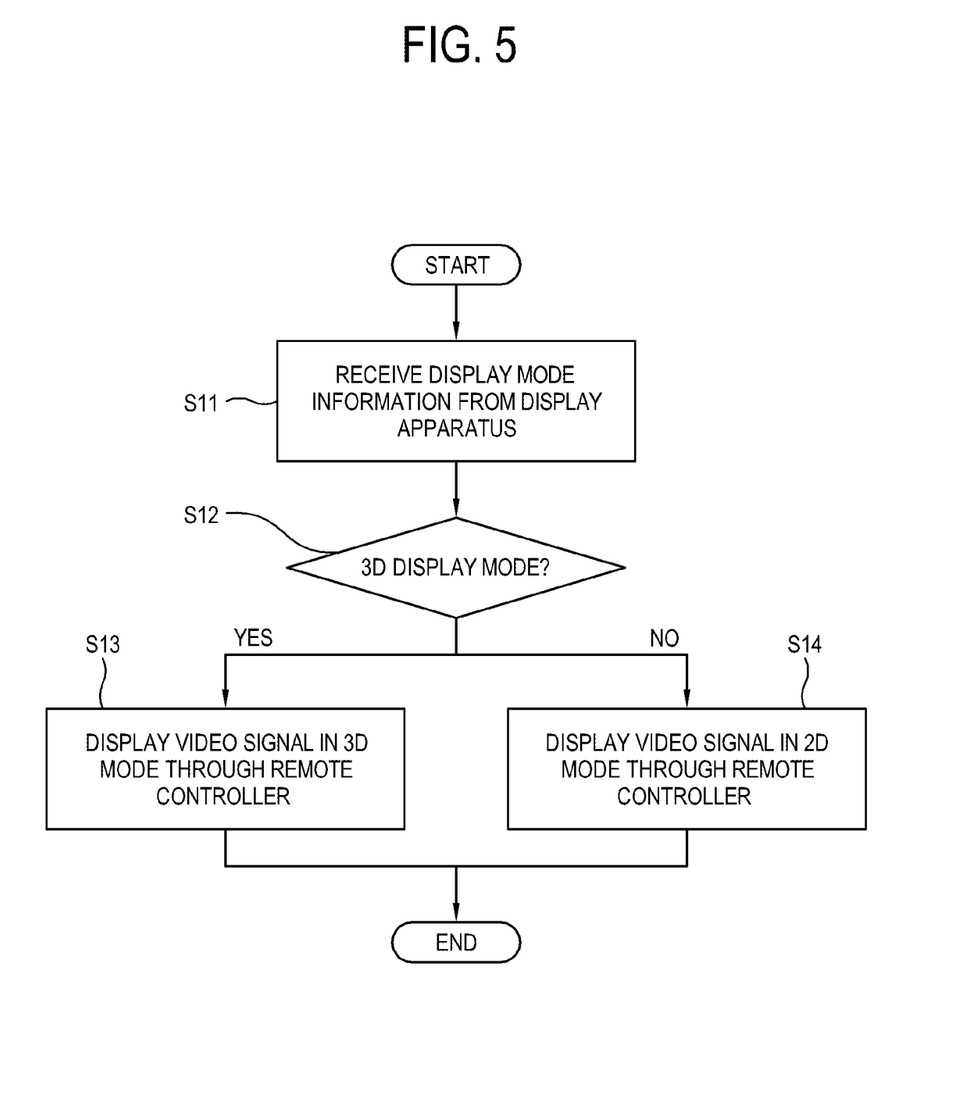
FIG. 5 is a control flowchart of a remote controller according to an exemplary embodiment.

FIG. 5 is a control flowchart of the remote controller according to an exemplary embodiment. The remote controller 100 receives the display mode information from the display apparatus 200 (S11).

If the display mode information is the 3D mode (Yes of S12), the remote controller 100 processes a video signal (e.g., predetermined) to be displayed in the 3D mode (S13). At this time, the remote controller 100 may receive a synchronous signal, which corresponds to an image displayed in the 3D mode, from the display apparatus 200. In sync with the received synchronous signal, the left- and right-eye images can be alternately displayed on the display unit 140 of the remote controller 100.

If the display mode information is not the 3D mode (No of S12), the remote controller 100 processes a video signal (e.g., predetermined) to be displayed in the 2D mode (S14).

Figure 6:
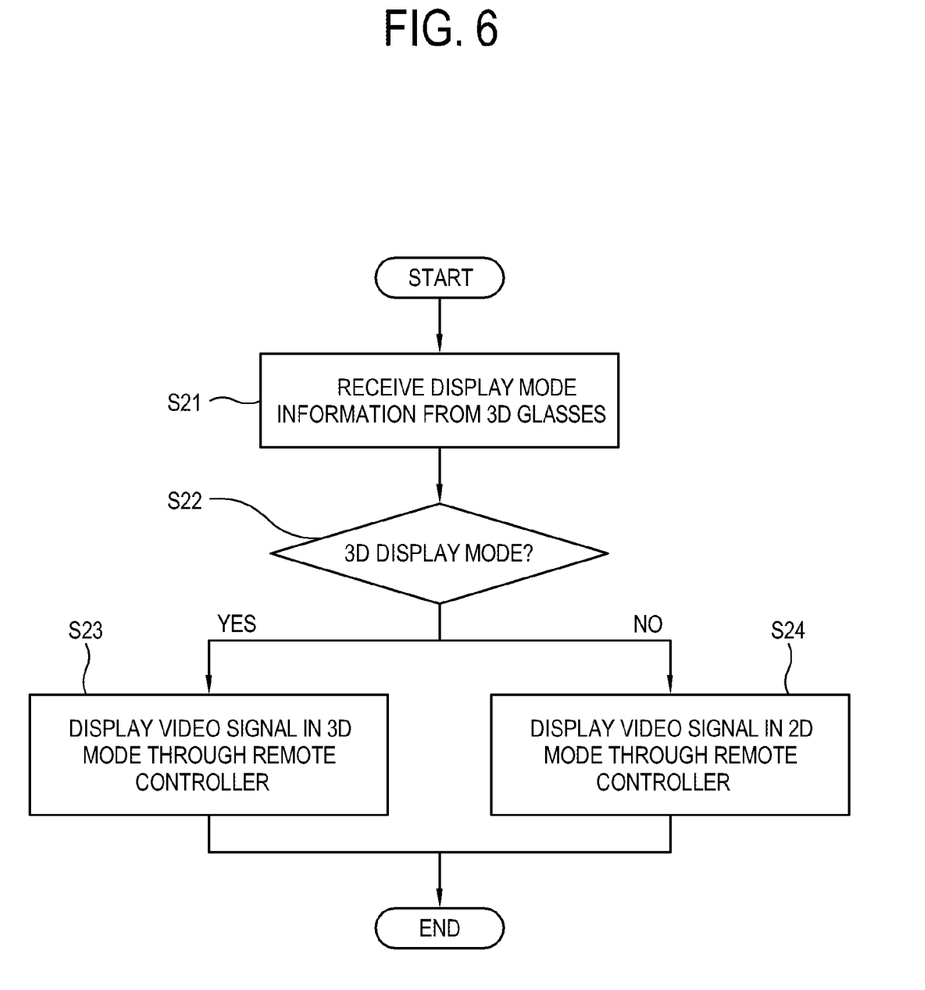
FIG. 6 is a control flowchart of a remote controller according to another exemplary embodiment.

FIG. 6 is a control flowchart of the remote controller according to another exemplary embodiment. The remote controller 100 receives the display mode information from the 3D glasses 300 (S21). The 3D glasses 300 may receive the display mode information from the display apparatus 200 interlocking with the 3D glasses 300, or generate the display mode information in accordance with operation of the 3D glasses 300.

If the display mode information is the 3D mode (Yes of S22), the remote controller 100 processes a video signal (e.g., predetermined) to be displayed in the 3D mode (S23). At this time, the remote controller 100 may receive a synchronous signal, corresponding to an image displayed in the 3D mode, from the 3D glasses 300. In sync with the received synchronous signal, the display unit 140 may alternately display the left- and right-eye images.

If the display mode information is not the 3D mode (No of S22), the remote controller 100 processes a video signal (e.g., predetermined) to be displayed in the 2D mode (S24).

As described above, there are provided a remote controller, a 3D display apparatus, 3D glasses and a control method thereof, in which a display unit of a remote controller displays an image in one of a two-dimensional (2D) mode and a 3D mode in accordance with a display mode of the 3D display apparatus or operation of the 3D glasses.

The above-described embodiments can also be embodied as computer readable codes which are stored on a computer readable recording medium (for example, non-transitory, or transitory) and executed by a computer or processor. The computer readable recording medium is any data storage device that can store data which can be thereafter read by a computer system, including the video apparatus.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion. Also, functional programs, codes, and code segments for accomplishing the embodiments can be easily construed by programmers skilled in the art to which the disclosure pertains. It will be understood that various modifications may be made. For example, suitable results may be achieved if the described techniques are performed in a different order and/or if components in a described system, architecture, device, or circuit are combined in a different manner and/or replaced or supplemented by other components or their equivalents.

Although exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A remote controller device configured for 2-way communication with 3D shutter glasses, comprising:
   a first communication unit configured to communicate with a three-dimensional (3D) display apparatus;
   a user input unit configured to allow a user to input a selection which controls the 3D display apparatus;
   a signal processor which selects one of a two-dimensional (2D) mode and a 3D mode and processes a video signal to be displayed in the selected mode;
   a display unit which displays the processed video signal in the selected mode; and a controller which controls the first communication unit to send to the 3D display apparatus a control signal corresponding to a user's selection input through the user input unit, and the signal processor to select one of the 2D mode and the 3D mode based on the display mode of the 3D display apparatus.

2. The remote controller according to claim 1, wherein the signal processor selects one of the 2D mode and the 3D mode based on display mode information received from the 3D display apparatus.

3. The remote controller according to claim 1, further comprising a second communication unit configured to communicate with 3D glasses interlocking with the 3D display apparatus,
   wherein the signal processor selects one of the 2D mode and the 3D mode based on display mode information received from the 3D glasses.

4. The remote controller according to claim 1, wherein the video signal is received from the 3D display apparatus.

5. The remote controller according to claim 1, wherein in the 3D mode, the display unit alternately displays a left-eye image and a right-eye image in sync with a synchronous signal received from the 3D display apparatus.

6. The remote controller according to claim 1, wherein in the 3D mode, the display unit alternately displays a left-eye image and a right-eye image in sync with a synchronous signal received from 3D glasses interlocking with the 3D display apparatus.

7. A display apparatus configured for 2-way communication with a remote controller device, comprising:
   a communication unit configured to communicate with a remote controller; a signal processor which selects one of a two-dimensional (2D) mode and a three-dimensional (3D) mode and processes a video signal to be displayed in the selected mode;
   a display unit which displays the processed video signal in the selected mode; and
   a controller which controls the communication unit to send the remote controller display mode information corresponding to a display mode of the display unit.

8. The display apparatus according to claim 7, further comprising a synchronous signal generator configured to generate a synchronous signal corresponding to a 3D image if the display unit displays the 3D image in the 3D mode.

9. The display apparatus according to claim 8, wherein the controller controls the communication unit to transmit the generated synchronous signal to the remote controller.

10. The display apparatus according to claim 8, further comprising a shutter communication unit configured to communicate with 3D glasses, wherein the controller controls the shutter communication unit to transmit the generated synchronous signal to the 3D glasses.

11. Three-dimensional (3D) glasses provided in a 3D display apparatus, the 3D glasses comprising:
a first communication unit configured to communicate with the 3D display apparatus;
a shutter unit which comprises a left shutter and a right shutter alternately opened and shut;
a second communication unit configured to communicate with a remote controller controlling the 3D display apparatus; and
a controller which controls the shutter unit to be selectively opened and shut in sync with a synchronous signal corresponding to a 3D image, received from the 3D display apparatus through the first communication unit, and controls the second communication to transmit display mode information of the 3D display apparatus to the remote controller.

12. A remote controller device configured for 2-way communication with 3D shutter glasses, comprising:
a first communication unit configured to communicate with a three-dimensional (3D) display apparatus;
a user input unit configured to allow a user to input a selection for controlling the 3D display apparatus;
a signal processor which processes a video signal; a display unit which displays the processed video signal; and
a controller which controls the first communication unit to send the 3D display apparatus a control signal corresponding to a user's selection input through the user input unit, and the signal processor to display a 3D video signal in a two-dimensional (2D) mode if the video signal is a 3D video signal.

13. The remote controller according to claim 12, wherein the controller controls the signal processor to display an image in the 2D mode based on a left-eye image of the 3D video signal.

14. The remote controller according to claim 12, wherein the controller controls the signal processor to display an image in the 2D mode based on a right-eye image of the 3D video signal.

15. The remote controller according to claim 12, wherein the video signal is received from the 3D display apparatus.

16. A display apparatus configured for 2-way communication with a remote controller device, comprising:
a communication unit configured to communicate with a remote controller controlling the display apparatus;
a signal processor which processes a video signal; a display unit which displays the processed video signal; and a controller which sends the remote controller a two-dimensional (2D) video signal based on one of a left-eye image and a right-eye image of a three-dimensional (3D) video signal if the video signal is the 3D video signal.

17. The display apparatus according to claim 16, wherein the controller controls the 2D video signal based on the left-eye image to be continuously transmitted to the remote controller.

18. The display apparatus according to claim 16, wherein the controller controls the 2D video signal based on the right-eye image to be continuously transmitted to the remote controller.

19. A method of controlling a remote controller for a three-dimensional (3D) display apparatus, the method comprising:
controlling a signal processor of the remote controller to select one of a 2D mode and a 3D mode based on a display mode of the 3D display apparatus and process a video signal in the selected mode; and
displaying the processed video signal on a display unit of the remote controller in the selected mode.

20. The method according to claim 19, further comprising receiving display mode information from the 3D display apparatus,
wherein the controlling comprises selecting one of the 2D mode and the 3D mode based on the received display mode information.

21. The method according to claim 19, further comprising receiving display mode information from 3D glasses interlocking with the 3D display apparatus,
wherein the controlling comprises selecting one of the 2D mode and the 3D mode based on the received display mode information.

22. The method according to claim 19, wherein the video signal is received from the 3D display apparatus.

23. The method according to claim 19, further comprising receiving a synchronous signal from the 3D display apparatus,
wherein the displaying comprises displaying a left-eye image and a right-eye image alternately in sync with the received synchronous signal if the display unit is in the 3D mode.

24. The method according to claim 19, further comprising receiving a synchronous signal from 3D glasses interlocking with the 3D display apparatus,
wherein the displaying comprises displaying a left-eye image and a right-eye image alternately in sync with the received synchronous signal if the display unit is in the 3D mode.

25. A method of controlling a three-dimensional (3D) display apparatus configured for 2-way communication with a remote controller device, the method comprising:
controlling a signal processor to select one of a two-dimensional (2D) mode and a 3D mode and process a video signal in the selected mode;
displaying the processed video signal on a display unit in the selected mode; and sending a remote controller display mode information corresponding to a display mode of the display unit.

26. The method according to claim 25, further comprising generating a synchronous signal corresponding to a 3D image if the display unit displays the 3D image in the 3D mode.

27. The method according to claim 26, further comprising transmitting the generated synchronous signal to the remote controller.

28. A method of controlling three-dimensional (3D) glasses provided in a 3D display apparatus, the method comprising:
controlling a shutter unit to open and shut a left shutter and a right shutter alternately in sync with a synchronous signal corresponding to a 3D image received from the 3D display apparatus; and
transmitting display mode information of the 3D display apparatus to a remote controller controlling the 3D display apparatus.

29. A non-transitory computer-readable medium containing instructions for controlling three-dimensional (3D) glasses provided in a 3D display apparatus coupled to the computer-readable medium, the instructions comprising:
controlling a shutter unit to open and shut a left shutter and a right shutter alternately in sync with a synchronous signal corresponding to a 3D image received from the 3D display apparatus; and
transmitting display mode information of the 3D display apparatus to a remote controller controlling the 3D display apparatus.

30. A non-transitory computer-readable medium containing instructions for controlling a remote controller for a three-dimensional (3D) display apparatus coupled to the computer-readable medium, the instructions comprising:
 controlling a signal processor to select one of a 2D mode and a 3D mode based on a display mode of the 3D display apparatus and process a video signal in the selected mode; and
 displaying the processed video signal on a display unit in the selected mode.

* * * * *